United States Patent
Kahler et al.

(10) Patent No.: US 12,544,204 B2
(45) Date of Patent: Feb. 10, 2026

(54) INTRAVAGINAL CULTURE INCUBATION CONTAINER AND METHOD

(71) Applicant: INVO Fertility, Inc., Sarasota, FL (US)

(72) Inventors: Lori H. Kahler, Lincoln, RI (US);
Kevin J. Doody, Bedford, TX (US);
John E. Walsh, Norfolk, MA (US)

(73) Assignee: INVO Fertility, Inc., Sarasota, FL (US)

( * ) Notice: Subject to any disclaimer, the term of this patent is extended or adjusted under 35 U.S.C. 154(b) by 829 days.

(21) Appl. No.: 16/949,960

(22) Filed: Nov. 20, 2020

(65) Prior Publication Data

US 2021/0145560 A1 May 20, 2021

Related U.S. Application Data

(60) Provisional application No. 62/938,122, filed on Nov. 20, 2019, provisional application No. 62/938,154, filed on Nov. 20, 2019.

(51) Int. Cl.
| | |
|---|---|
| *A61D 19/04* | (2006.01) |
| *A61B 17/435* | (2006.01) |
| *A61D 19/02* | (2006.01) |
| *C12M 1/34* | (2006.01) |

(52) U.S. Cl.
CPC .......... *A61D 19/022* (2013.01); *A61B 17/435* (2013.01); *A61D 19/04* (2013.01); *C12M 41/32* (2013.01)

(58) Field of Classification Search
None
See application file for complete search history.

(56) References Cited

U.S. PATENT DOCUMENTS

| | | | |
|---|---|---|---|
| 4,902,286 A | 2/1990 | Ranoux | |
| 5,084,004 A | 1/1992 | Ranoux | |
| 5,135,865 A | 8/1992 | Ranoux | |
| 5,270,011 A * | 12/1993 | Altherr | B01L 3/50825 220/834 |
| 5,681,742 A * | 10/1997 | MersKelly | B01L 3/508 222/499 |
| 6,050,935 A | 4/2000 | Ranoux et al. | |
| RE39,533 E | 3/2007 | Ranoux | |
| 7,282,363 B1 * | 10/2007 | Ranoux | C07C 229/64 600/35 |
| 7,759,115 B2 | 7/2010 | Etheredge, III et al. | |
| 2004/0157205 A1* | 8/2004 | Etheredge, III | A61D 19/022 435/1.1 |
| 2010/0196871 A1* | 8/2010 | Dodgson | C12M 21/08 435/284.1 |

(Continued)

OTHER PUBLICATIONS

R. Frydman, C. Ranoux, INVO: a simple, low cost effective assisted reproductive technology, ESHRE Monographs, vol. 2008, Issue 1, Jul. 2008, pp. 85-89, https://doi.org/10.1093/humrep/den163 (Year: 2008).*

(Continued)

*Primary Examiner* — Michael A Marcheschi
*Assistant Examiner* — Nathan G Esperon
(74) *Attorney, Agent, or Firm* — NIXON & VANDERHYE

(57) ABSTRACT

Intravaginal culture (IVC) container for intravaginal fertilization and culture of mammalian, and in particular human, oocytes, featuring an increased volume, and a method of using the same.

9 Claims, 7 Drawing Sheets

(56) References Cited

U.S. PATENT DOCUMENTS

2022/0143602 A1* 5/2022 Sims .................. B01L 3/50855

OTHER PUBLICATIONS

Frydman. "INVO: a simple, low cost effective assisted reproductive technology" Human Reproduction. 2008. (Year: 2008).*
Lucena. "INVO Procedure: Minimally Invasive IVF as an Alternative Treatment Option for Infertile Couples" The Scientific Word Journal. 2012. (Year: 2012).*
International Search Report issued in International Application No. PCT/US21/13798 dated Apr. 20, 2021.
Written Opinion of the International Searching Authority issued in International Application No. PCT/US21/13798 dated Apr. 20, 2021.
Fukuda, M. et al., "Unexpected low oxygen tension of intravaginal culture," Human Reproduction, vol. 11, No. 6, pp. 1293-1296, 1996.

* cited by examiner

INTRAVAGINAL CULTURE INCUBATION CONTAINER AND METHOD

RELATED APPLICATIONS

This application claims priority to divisional application Nos. 62/938,122 filed Nov. 20, 2019 and 62/938,154 filed Nov. 20, 2019, both of which are herein incorporated by reference in total.

BACKGROUND OF THE INVENTION

This invention relates to an improved intravaginal culture (IVC) container for intravaginal fertilization and culture of mammalian, and in particular human, oocytes and an embryo transfer method employing such a container.

Intravaginal culture has been developed and comprises maturation of gametes, fertilization, and embryo development in a sealed container filled with a suitable culture medium and placed in the vaginal cavity, which serves as an incubator. This procedure and the fertilization and culture container are disclosed in U.S. Pat. Nos. 4,902,286; 5,135,865; 6,050,935; 7,282,363 and 7,759,115. The technology is designed and utilized as an Assisted Reproductive Technology (ART) by reproductive endocrinologist specialists in their offices or clinics.

Prior to the original IVC container, all IVC procedures for experimental and clinical purposes had been performed using a polypropylene cryotube manufactured by Nunc, of Kamptrup, Denmark and hermetically closed and sealed in a polyethylene cryoflex envelope also manufactured by Nunc. The cryotubes and associated cryoflex envelopes were designed for cryopreservation of tissue specimens. The Nunc cryotube and cryoflex envelope have considerable drawbacks when used to perform IVC Many of these drawbacks of the Nunc cryotube are obviated by the original IVC container disclosed in U.S. Pat. Nos. 4,902,286, 5,135,865, 6,050,935, 7,282,363, and 7,759,115. U.S. Pat. No. 6,050,935 describes the original IVC container assembly comprising a container body and resealable closure means for selectively opening and closing a container body orifice. The container body has a main chamber with cylindrical sidewalls in communication with each other which permits the movement of one or more embryo(s) in the vessel. The sidewalls are of optical quality permitting microscopic inspection of embryos. The container body is equipped with various valve designs which are either bulky or of complex construction and/or uneasy to operate. A two-piece capsule envelopes the container designed for lodgment in the posterior fornix of the vagina.

When such an IVC container is taken out of the posterior fornix of the vagina, the outer capsule is removed and the embryos may be inspected under a microscope or embryos may be moved to a culture dish for evaluation. One or more embryos is then retrieved from the vessel or culture dish by a catheter for transfer to the uterus. This is done while the patient is being prepared for the transfer of the embryo(s). The entire procedure is also designed to be carried out by a reproductive endocrinologist or other assisted reproductive specialist in an office or clinic with a minimum of equipment.

The IVC container assembly comprises an outer rigid shell which maintains the sterility of an inner vessel and cap member and prevents the loss of oocytes and/or sperm during their introduction. Moreover, the inner vessel or cap member limits the area of contact between the culture medium and the surrounding environment and maintains a stable pH of the culture medium.

The development of IVC had been hindered by the lack of a container the use of which is simple and safe, which does not involve the high level of laboratory skill that had been required, and which can avoid transfer of the embryos from the container to a Petri dish for microscopic inspection before their ultimate transfer to the uterine cavity. The original IVC container is simple and safe to use and does not involve a high level of laboratory skills required during traditional in-vitro fertilization (IVF).

The original IVC container limited the number of oocytes that could be placed in the device to not exceed ten (10) oocytes and limited the vaginal incubation period to 3-days.

BRIEF SUMMARY OF THE INVENTION

The improved IVC container no longer includes a microchamber, which limited the volume of the original IVC container, thereby, limiting the number of oocytes recommended for use with the device and limiting vaginal incubation to 3-days. The upper part of the vessel flows seamlessly down to the bottom, and there is no separate chamber. The removal of the microchamber increased the inner vessel volume by ~29% enabling an increase in culture media and gametes that may be stored in the inner vessel for vaginal incubation. See FIG. 6.

The improved IVC container has several advantages over the original IVC container disclosed in U.S. Pat. Nos. 6,050,935, 7,282,363 and 7,759,115.

An object of the present invention is to provide an intravaginal fertilization and culture container which expands fertilization and embryo development for intravaginal fertilization and culture from 3-day vaginal incubation to 5-day or more vaginal incubation. In the method of intravaginal culture, the preferred embodiment for incubation duration with the improved IVC container is 3-day to 5-day vaginal incubation and according to another embodiment may include 6-day incubation duration.

In the method of intravaginal culture fertility treatment, the improved IVC advantages consist of the following:

1. Elimination of the inner vessel microchamber, which increases volume of the improved IVC container by ~29%. This has the advantage of removing the restriction on the number of oocytes that can be placed in the device due to the increase of ~22% in biological medium (from 0.7 mL to 0.9 mL) that can be placed in the improved IVC container inner vessel (see FIG. 6).

The increase in biological medium provides additional nutrients necessary for fertilization and embryo development through the 5-day vaginal incubation period.

2. The improved IVC container allows for a longer vaginal incubation period, with the following advantages:
  a. Improved blastocyst quality
  b. Improved fertilization rate
  c. Improved clinical pregnancy rated
  d. Improved live birth rate.

3. The improved vessel cap (inverted dome-shape) designed for displacing 0.043 mL volume in the vessel. This has the advantages of removing air bubbles during cap closure, which prevents interference with access to available nutrients and provides the optimal environment necessary for fertilization and embryo development (see FIG. 6).

The improved IVC container, with the increase in volume, ensures optimal nutrients for fertilization and embryo development throughout the 5-day incubation.

The improved IVC container maintains the atmosphere that is naturally CO2 enriched throughout the 5-day vaginal incubation period. Likewise, the temperature is that of the natural environment of the vagina and the intravaginally CO2 enriched environment ensures the pH in the container is relatively constant and about 7.3 and that a lower level of CO2 in the container will cause a drop in the pH of the biological medium in which the embryo(s) reside throughout the 5-day vaginal incubation. A relatively small change in the pH (say 0.5) may have drastic consequences over a long period of culture on the embryo(s). With the improved IVC contain, the CO2, pH and Temperature is now maintained throughout the 5-day incubation period compared to the original IVC container, which could only maintain the CO2, pH and Temperature throughout a 3-day incubation period. The enhanced environment of the improved IVC container, including optimal nutrients, provides for improved outcomes including improved blastocyst quality, improved fertilization rate, improved clinical pregnancy rate and improved live birth rate that is comparable to current In vitro Fertilization (IVF) through 5-day incubation.

The improved IVC container provides the enhanced environment necessary for fertilization and embryo development to occur during the 5-day vaginal incubation period. With the improved IVC container, the vessel will still remain in a CO2 enriched environment even after it is removed from the CO2 incubation environment or and in particular a vagina. Thereafter, the CO2 enriched air in the buffer chamber will be able to enter the vessel and compensate for any fall in the CO2 level inside the vessel and thereby mediate the pH in the biological medium within the improved IVC container. Indeed, it has been found if such a buffer chamber is provided on the incubation or storage vessel, the pH level of the biological medium in the vessel will fall only slightly over the period of about one or two hours after the removal of the container assembly from the CO2 enriched environment. Such a small dip in the pH level does not have any significant effect on the embryo(s) in the biological medium.

According to an embodiment, the buffer chamber comprises a outer rigid shell mounted on the vessel with a CO2 permeable seal disposed between the vessel and the outer rigid shell to prevent the ingress of liquids or other viscous fluids, in particular vaginal secretions while allowing the inflow of the CO2 enriched air from the surroundings and in the case of intravaginal incubation, from the vagina. In practice, the CO2 inflow rate of the permeable seal will be greater than the inflow rate of CO2 through the permeable wall of the vessel and very much greater than the CO2 outflow rate through the outer rigid shell wall.

According to another embodiment, the outer rigid shell is mounted for movement on the vessel between open and closed positions. The outer rigid shell will be in its open position when the container assembly is introduced into a CO2 enriched air environment, such as a vagina in the case of intravaginal use and is closed as soon as the container assembly is removed from the CO2 enriched air environment. In such an embodiment, the CO2 enriched air outflow may be virtually nil during the period between the removal of the container assembly from the CO2 enriched environment and the retrieval of the embryos from the vessel for transfer to a recipient, thereby ensuring CO2 equilibration in the biological medium.

In the course of residence in the CO2 enriched intravaginal environment, the level of oxygen in the buffer chamber will reach the favorably depleted O2 level which prevails in the vagina. Thus, after the container assembly is removed, not only is the air inside the buffer chamber advantageously enriched in CO2 but also reduced in O2.

According to an embodiment of the invention, the vessel is provided with a closure device including overlying inverted dome-shaped cap, mounted for relative angular movement between an open position for access to the interior of the vessel and a closed position for sealing off access to close the vessel.

The improved vessel's cap is designed to be turned when placed on the vessel (closed) or turned and removed off the vessel (open) allowing for ease of filling and streamlines removal of air bubbles that occur during the normal filling of the vessel.

The inner wall surface of the main chamber of the vessel tapers gradually and flows towards the bottom of the vessel. Thus, when the container assembly is received in the posterior fornix, which is in a substantially horizontal position, except when the recipient lays on her side, the inner wall surface slopes, where gametes will tend to congregate, thereby enhancing the probability of contact between sperm and oocytes.

An object consists of a single size cylindrical shaped cup retention device comprised of medical grade silicone for accommodating the container assembly in the vaginal cavity, which simply and expediently envelopes the IVC container assembly for lodgment in the posterior fornix, without risk of injury, and capable of adapting to a wide range of anatomical variations (see FIG. 7).

According to an aspect of the invention, there is provided an intravaginal fertilization and culture container comprising an inner vessel having an orifice and resealable closure means for selectively opening and closing the inner vessel orifice. The main chamber inner vessel is for receiving the culture medium, oocytes and sperm and allows for the collecting for transfer of one or more embryos. The original inner vessel included a microchamber for the collection of embryos during fertilization and embryo development across 3-day vaginal incubation. This microchamber was removed in the present invention to expand the volume of the inner vessel by ~29%, which allows for increased volume of culture media thereby providing access to additional nutrients required for fertilization and embryo development over 5-day or more vaginal incubation.

According to still another aspect of the invention, there is provided an IVC container having a main chamber, the internal volume of the main chamber being ~1.4 ml.

According to a still further aspect of the invention, there is provided an IVC container assembly comprising an inner vessel having an orifice and resealable closure means for selectively opening and closing the orifice and a tubular cylindrical shaped cup for enveloping the container, the cylindrical shaped cup having a smooth and continuous outer surface and an internal configuration generally complementary to the external configuration of the container.

According to yet another aspect of the invention, there is provided an IVC container assembly comprising an inner vessel having an orifice, releasable closure means for selectively opening and closing the inner vessel orifice, and a cylindrical shaped cup for enveloping the container, the cylindrical shaped cup being made of medical grade crystal styrene having a smooth and continuous outer surface of high clarity and disposed proximate to an end of the cylindrical shaped cup for adapting the longitudinal dimensions of the assembly to a chordal dimension of the posterior fornix when the intravaginal fertilization and culture container is received therein.

According to a further aspect of the invention, there is provided an IVC container assembly comprising an inner vessel having an orifice with releasable closure means comprising a cap member having a throttle passage and means for compressing the inverted dome-shaped cap member to collapse and seal the throttle passage, thereby closing off the IVC container chambers.

According to a still further aspect of the invention, there is provided an IVC container assembly comprising an inner vessel with resealable closure means having a passageway preferably defined by an interior sleeve opening on to one end of the container and a two-part tubular cylindrical shaped cup for enveloping the container, one of the parts having an inwardly extending central plug adapted to be received in and to seal off the passageway.

According to one last aspect of the invention, there is provided an improved method including the steps of co-incubation enhanced procedure to place oocytes with attached spermatozoa in the container and intravaginally incubating gametes in a closed IVC container, which expands fertilization and embryo development for intravaginal fertilization and culture from 3-day vaginal incubation to 5-day or more.

These and other objects and advantages of the present invention will be brought out in the description of embodiments.

DETAILED DESCRIPTION OF THE INVENTION

Figure 1:
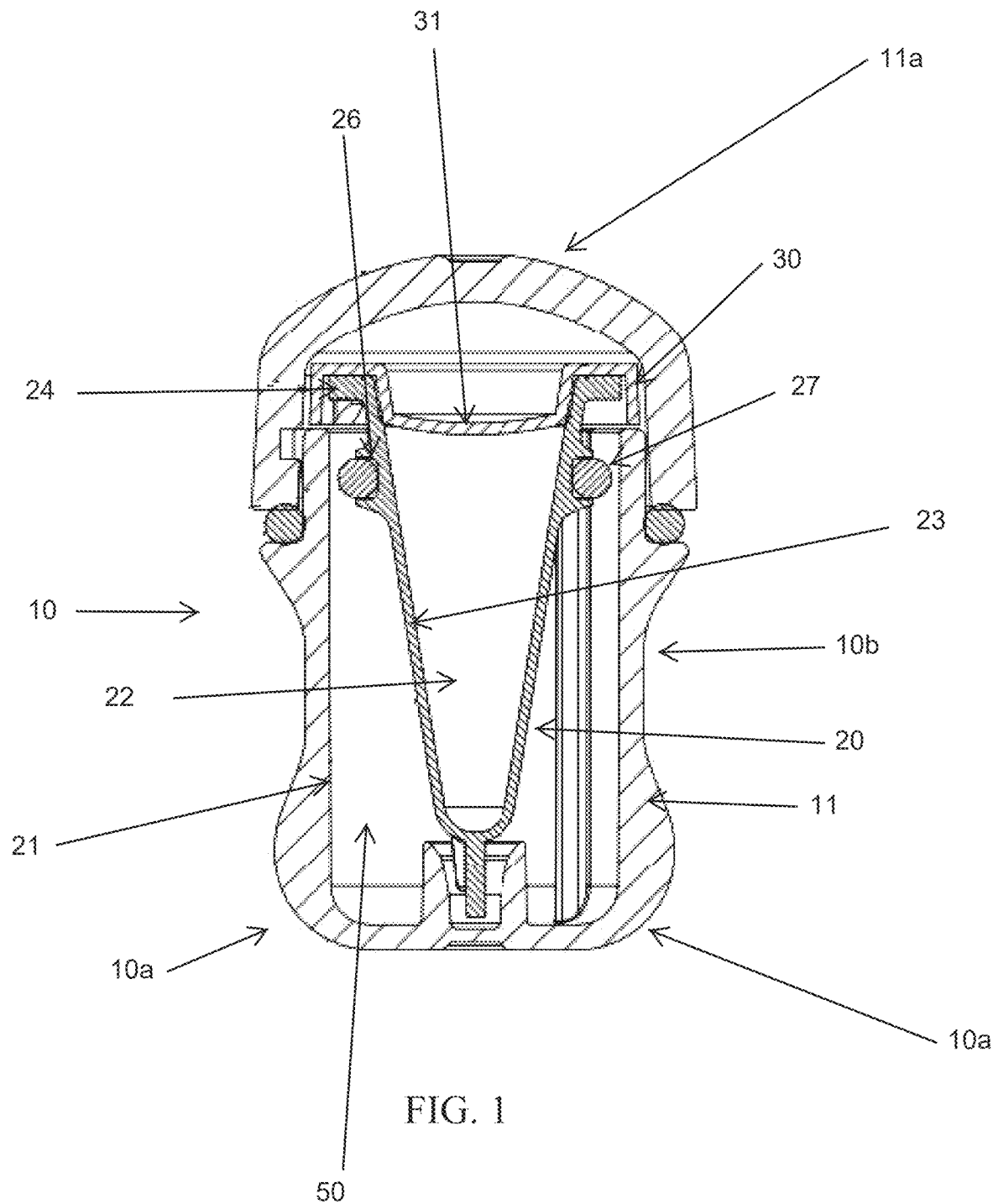
FIG. 1 shows the improved IVC container with the top of the enclosed cover and the bottom of the enclosed cover sealed together with a sealing O-Ring, and with the inner chamber and the cap of the inner chamber within the outer cover.
Figure 2:
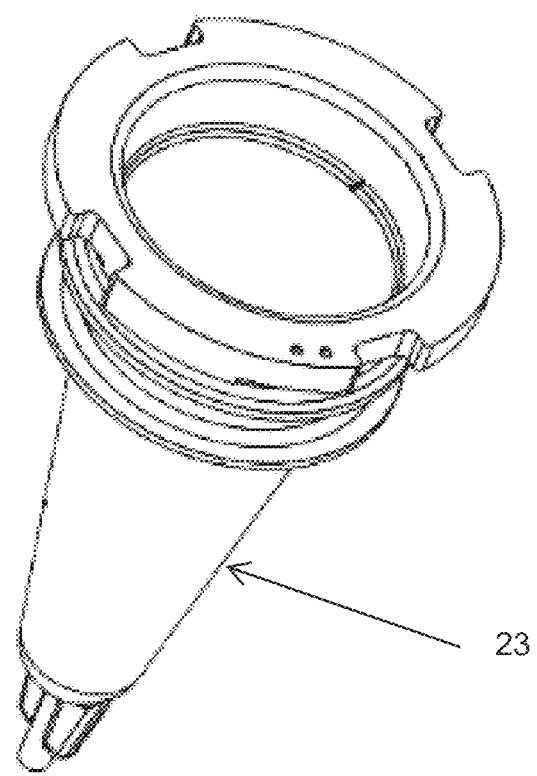
FIG. 2 shows the improved IVC container without the enclosed cover and without the cap, showing the full opening of the container without the cap.
Figure 3:
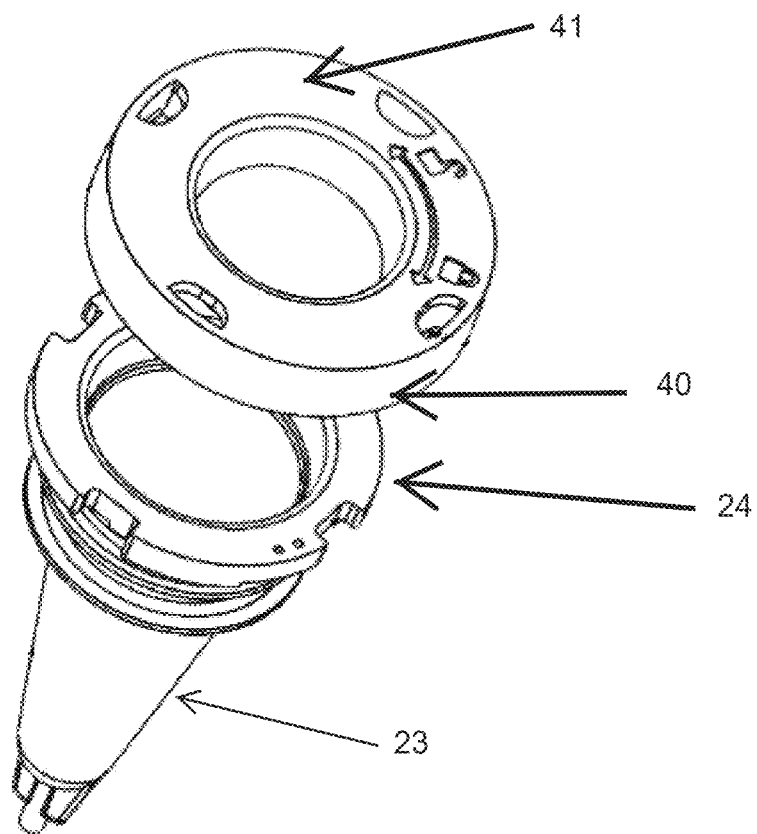
FIG. 3 shows the improved IVC container with the cap for the inner chamber exploded from the inner chamber, and showing the tabs in the cap aligned with the slots in the top of the inner chamber.
Figure 4:
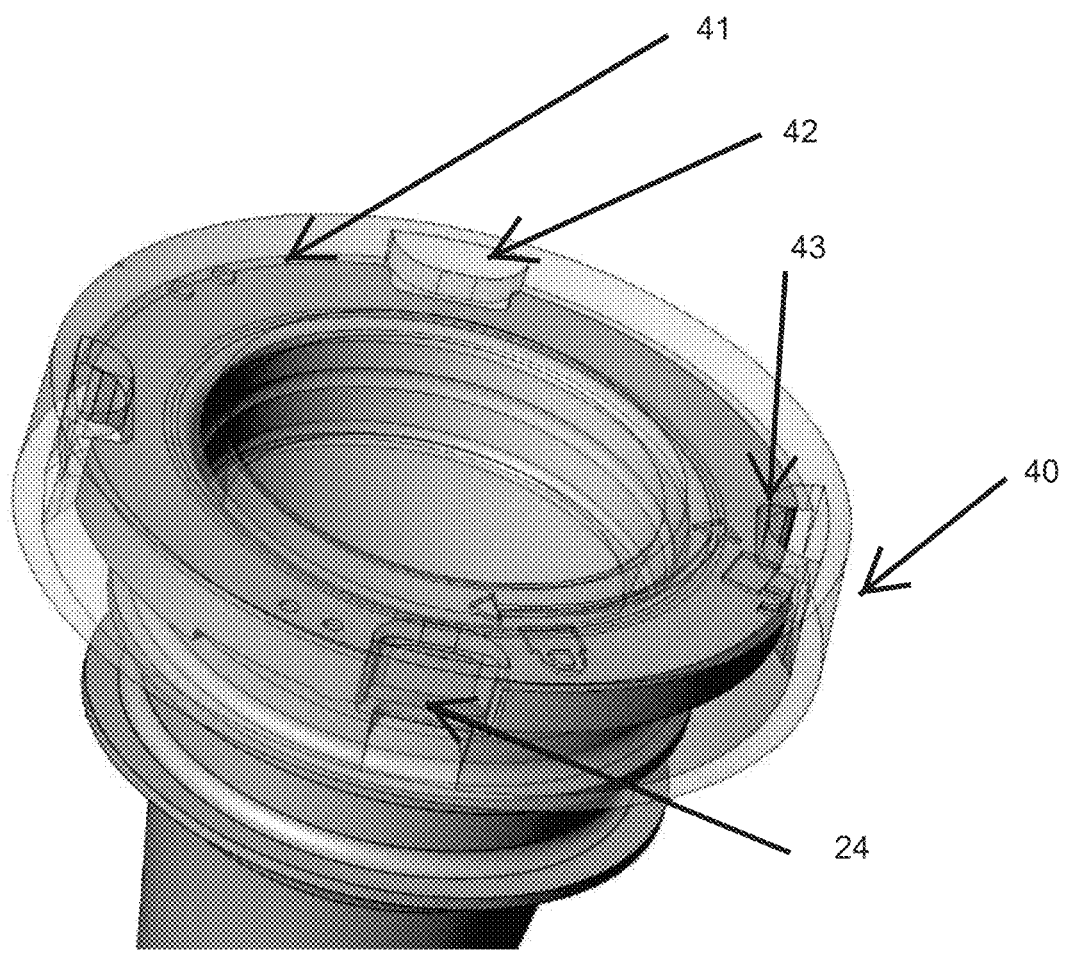
FIG. 4 shows a close up view of a transparent cap secured onto the inner chamber, and the manner in which the tabs in the cap slot within the slots in the top of the inner chamber.
Figure 5:
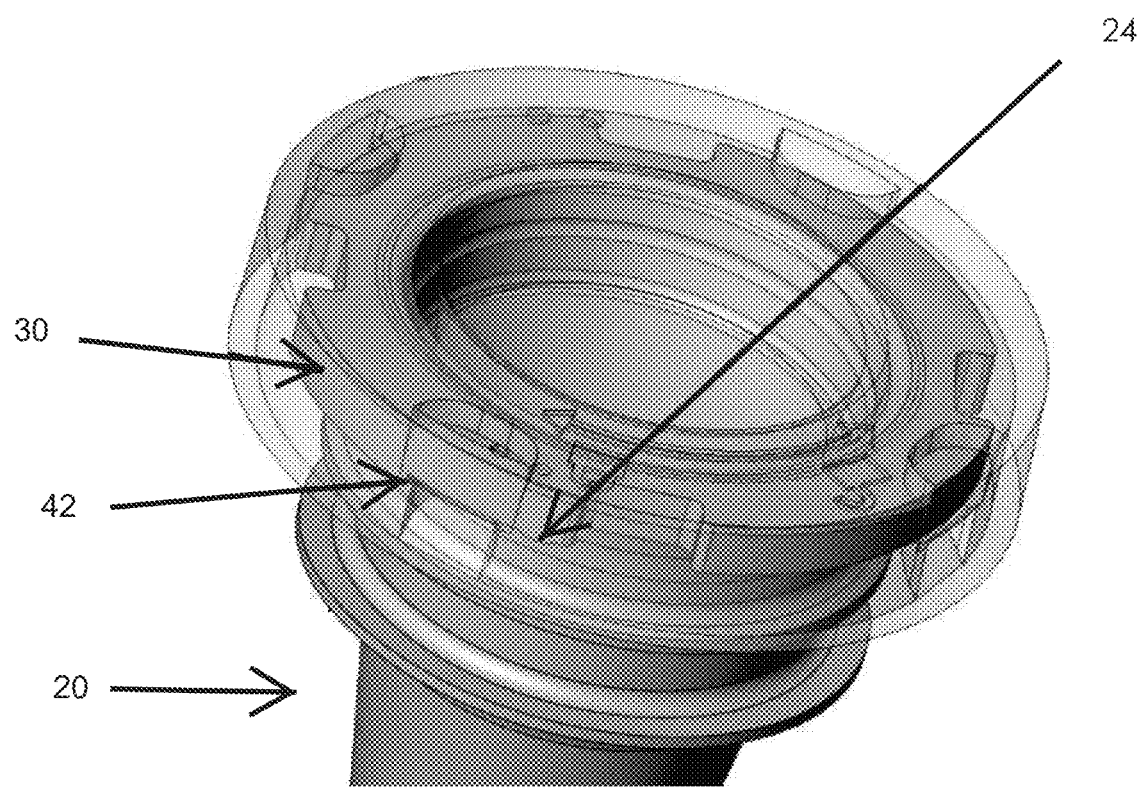
FIG. 5 shows is similar to FIG. 4, but shows the cap twisted and locked onto the inner chamber past such that the tabs slide along a flange past a locking bump and against a stop, locking the cap in place.
Figure 6:
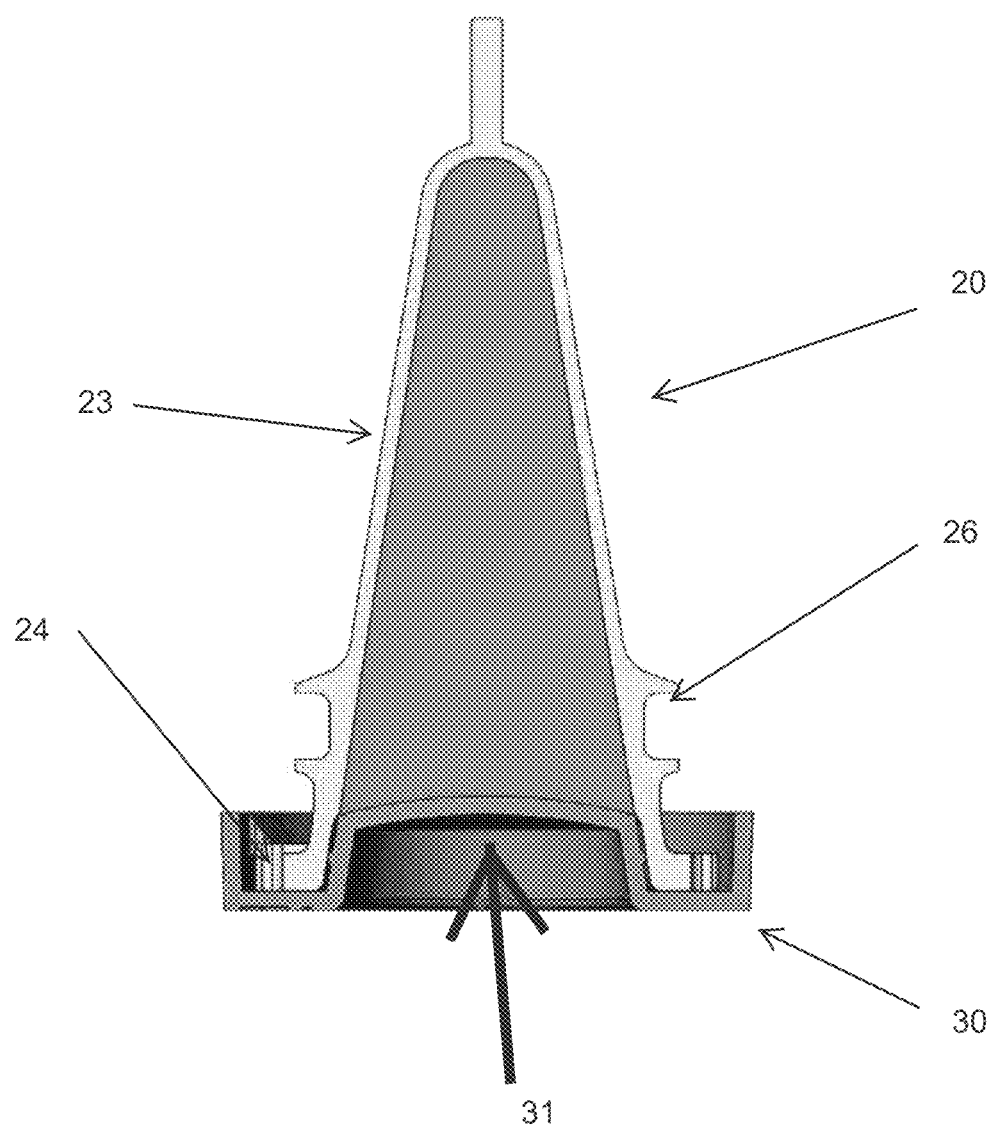
FIG. 6 shows a cross section of the inner chamber with the cap secured, and the inverted dome shape of cap.

An embodiment of the container assembly 10 for incubating and/or storing gametes and/or one or more embryos is depicted in FIGS. 1-6. Such a container assembly 10 is suitable for intravaginal incubation or culture (IVC) of human or mammalian embryos for up to 6 days of vaginal incubation, and for use as a storage and transport container for gametes and/or one or more human or other mammalian embryos.

According to a preferred embodiment of the invention, the IVC container assembly 10 comprises an outer rigid shell 11 with a resealable closure cap member 11a.

The terms "upper" and "lower" are used by convention in the specification and claims to refer to relative positions in the container assembly 10 as oriented in FIGS. 1-5, where the cap fits on the upper area of the inner vessel 20, and the lower area of the inner vessel 20 tapers and flows to the bottom. Such terms are not intended to be in any way limiting as to orientation or location of the container assembly 10 which in actual practice will vary depending on the stage of the procedure in which it is employed.

The container assembly 10 comprises an inner vessel 20 having a closure device 30 for opening and closing access to the interior of the vessel. The inner vessel 20 is at least partly surrounded and preferably substantially entirely surrounded by a buffer chamber 50 comprising an outer rigid shell 11 cooperating with the inner vessel 20.

The inner vessel 20 comprises a single chamber. The inner wall surface of the main chamber 22 tapers towards bottom. As the upper end of the main chamber 22 in this environment is circular and the lower end is substantially oval, the contour of the inner wall surface varies from a circle to an oval. All sidewalls 23, are of sufficient optical quality to permit inspection under microscope or other magnification instrumentation. The entire vessel will be made of a material of good optical quality, such as medical grade crystal styrene. The crystal styrene has a $CO_2$ permeability required for fertilization and embryo development within the improved IVC container. The vessel has a rounded peripheral flange 24 extending radially outwardly from the upper end thereof.

The IVC container assembly 10 holds and maintains the sterility of the inner vessel 20. The inner vessel has a resealable closure means including an inverted dome-shaped cap member 31. The complete IVC container assembly 10 are preferably molded from medical grade crystal styrene, polypropylene or other biocompatible relatively rigid biocompatible plastics materials. This plastics material should be $CO_2$ permeable in order to enable that gas to permeate the container wall from the vagina into the contained culture medium. (See Misao Fukuda et al, Unexpected low oxygen tension of intravaginal culture, Human Reproduction, vol. No 6, pp. 1285-1295, 1996.)

The inner vessel 20 has a generally cylindrical sidewalls defining a main chamber 22. The interior surface of the main chamber are smooth and rounded throughout and devoid of any surface roughness or sharp edges liable to damage gametes or embryos.

In the lower position, a closure seal is defined by the annular notch at the upper end of the outer rigid shell 11 which works together with a peripheral portion of the undersurface of the peripheral flange 24 of the vessel and the free edge of the peripheral flange 24 of the vessel and possibly the free edge of the peripheral flange of the cap. The closure seal is essentially defined by the contact between the notch and the portions of the peripheral flange 24 of the vessel. In accordance with a variant, not illustrated, an additional sealing member or gasket may be provided either at the upper end of the outer rigid shell 11 or at the peripheral flange 24 of the vessel and/or cap. Such an additional sealing member or gasket will be of very low gas permeability to prevent the escape of the atmosphere contained in the buffer chamber 50 or the entry of the ambient atmosphere into the buffer chamber 50. Such an embodiment is therefore suitable for prolonged storage of many hours or even days.

The closure device 30 is provided at the open upper end of the vessel body and comprises in a preferred embodiment including one inverted dome-shaped cap 31. The cap 31 can be brought into registration in the fully open position of the open device and out of communication in the fully closed position of the closure device. The inverted contour of the cap enhances the filling and sealing engagement by displacing air bubbles that naturally form when filling the inner vessel 20 as well as preventing leaking from the inner vessel 20.

The inverted dome-shaped cap member 31 is preferably made of a biocompatible plastic or other synthetic material, and preferably silicone of high purity. The constituent material will be compliant so that the resealable access opening it defines may hermetically close off the main chamber 22 of the inner vessel 20. The cap member comprises from its front end to its rear end, in axial succession, a tapered flange protruding radially outwardly and complementary in cross section to the oval cylindrical section of the inner vessel 20 and adapted to mate therewith in the open position of the cap member. Rearward of the flange is a cylindrical intermediate portion having a pair of radially protruding, longitudinally extending bosses diametrically opposed to one another, and therebeyond at the rear end of the cap member, a pair of part cylindrical prongs facing each other and extending over arcs of about 110 degree.

The interior of the cap member 31 comprises from its front end to its rear end a continuous passageway defining the access opening to the main chamber 22 and including a forwardly diverging frustoconical section of elliptical cross section connected to a slightly forwardly converging intermediate section also of elliptical cross section, followed by a more markedly forwardly converging rear section, also of elliptical cross section. It will be noted that the major axes of the elliptical cross sections of the passageway through the cap member are substantially orthogonal to the major axis of the oval or elliptical flange thereon.

The closure device 30 is provided at the open upper end of the vessel body and comprises in a preferred embodiment including one inverted dome-shaped cap member 31. The cap member 31 can be brought into registration in the fully open position of the open device and out of communication in the fully closed position of the closure device 30. The inner vessel 20 is at least partly surrounded and preferably substantially entirely surrounded by a buffer chamber 50 comprising an outer rigid shell 11 and resealable closure cap member 11a cooperating with the inner vessel 20. Thus assembled, the resealable closure cap member 11a can be rotated clockwise or counter clockwise to stable rest positions. The stable rest positions correspond, respectively, to the open and closed position of the cap member.

The resealable closure cap member 11a is rotated 90° from an open position to a closed position, sealing off the access opening to the main chamber 21 and closing off communication between the container assembly 10 and the surroundings.

A peripheral sidewall 40 extends downwardly from the peripheral flange 41 of the cap and has a radially inwardly projecting hooking member 42 that works together with the undersurface of at least one of the peripheral flanges of the vessel 24 and inverted domed cap 31. The peripheral flange 24 and the adjoining peripheral sidewall 40 have a plurality of spaced cutouts, a first portion of each cutout having radially inwardly flaring sides being located in the peripheral flange 24 and a second portion extending downwardly along the peripheral sidewall 40 and defined by leading and lagging parallel edges, generally in alignment with the respective hooking members 42.

The edge of the peripheral flange cap 41 will ride along and clear the oblique undersurfaces of the hooking members 42 and snap into the space between the upper end surface of the hooking member 42 and the underside of the central panel of the upper cap. The outer diameter of the peripheral flange of the cap 41 and the peripheral flange 24 of the vessel is slightly greater than the diametrical distance between the radially inner ends 43 of the hooking members 42 thereby preventing the escape of the outer cap off of the peripheral flange 24 of the vessel. The cap may be made of the medical grade polypropylene.

The outer surface of the vessel body has a radially outwardly opening annular groove 26 for accommodating a sealing member 27 which may be an O-ring. When the vessel is received in the outer rigid shell, the sealing member 27 is in sealing engagement with the intermediate, bight portion of the groove and the inner wall surface 21 of the outer rigid shell 11 in alignment therewith. The sealing member 27 in the illustrated embodiment has various features, the most important of which is its high $CO_2$ permeability and $CO_2$ flow rates permitting the inflow of $CO_2$ enriched air from a surrounding $CO_2$ enriched environment. The $CO_2$ inflow rate should enable the $CO_2$ level in the buffer chamber 50 to reach the level in the surrounding $CO_2$ environment in less than about eight hours and preferably in less than about three hours. The flow rate should not be too high so as to cause a significant outflow of the $CO_2$ enriched gas from the buffer chamber 50 in less than two hours. Another advantageous feature of the sealing member 27 is its permeability to $O_2$ to enable the depleted levels of $O_2$ in the $CO_2$ enriched environment to replace the normal level of $O_2$ in the ambient air after the container assembly 10 is placed in the $CO_2$ enriched and $O_2$ lean environment. In practice, the sealing member 27 will be air permeable and therefore allows the in- and outflow of all gases in the ambient air, especially $N_2$, $CO_2$ and $O_2$. Another advantageous feature of the sealing member 27 is to define a barrier to liquids or viscous substances and in particular vaginal secretions when the container assembly 10 is intended for intravaginal use. Another advantageous feature of the sealing member 27 is to define a barrier against the entry of bacteria and even viruses present in a vagina when the container assembly 10 is to be used intravaginally. Such a sealing member 27 effective against the ingress of vaginal secretions, bacteria and viruses will prevent their entry into the buffer chamber 50 and avoid possible contamination of the contents of the vessel via the vessel walls.

A suitable material having all foregoing features is a medical grade silicone which has a very high permeability of the order of 300,000 cm3×0.001 in/100 in2×24 hr×atm. Such an example is, however, not intended to be limiting. The $CO_2$ permeability of the seal may be very much less than that of medical grade silicone and even low as about 7.6 cm3×0.001 in/100 in2×24 hr×atm in the case of a Nylon 66 gasket. Whatever the seal material is selected, it should enable equilibration between $CO_2$ level in the $CO_2$ enriched environment of the vagina or other incubator and that of the buffer chamber 50 in less than about eight hours and preferably in about three hours.

The outer rigid shell 11 is made of a material having good clarity for inspection of the contents through the wall of the outer rigid shell 11. To this end, it preferably has diametrically opposed planar zones of optical quality adapted to be in alignment with the sidewalls 23 of the vessel. A suitable material for the outer rigid shell 11 is medical grade crystal styrene having an adequate CO2 permeability. The thickness of the outer rigid shell 11 wall should be at least about twice the thickness of the vessel wall to ensure that the CO2 flow rate through the vessel wall will be substantially greater than the CO2 flow rate through the outer rigid shell 11. The outer rigid shell 11 may alternatively be made of a material having a substantially nil CO2 permeability such as, for example, glass having suitable mechanical properties. When an outer rigid shell 11 of no or very low permeability is employed, obviously essentially all CO2 and/or O2 flow will be through the seal between the vessel wall and the outer rigid shell 11 wall.

Figure 7:
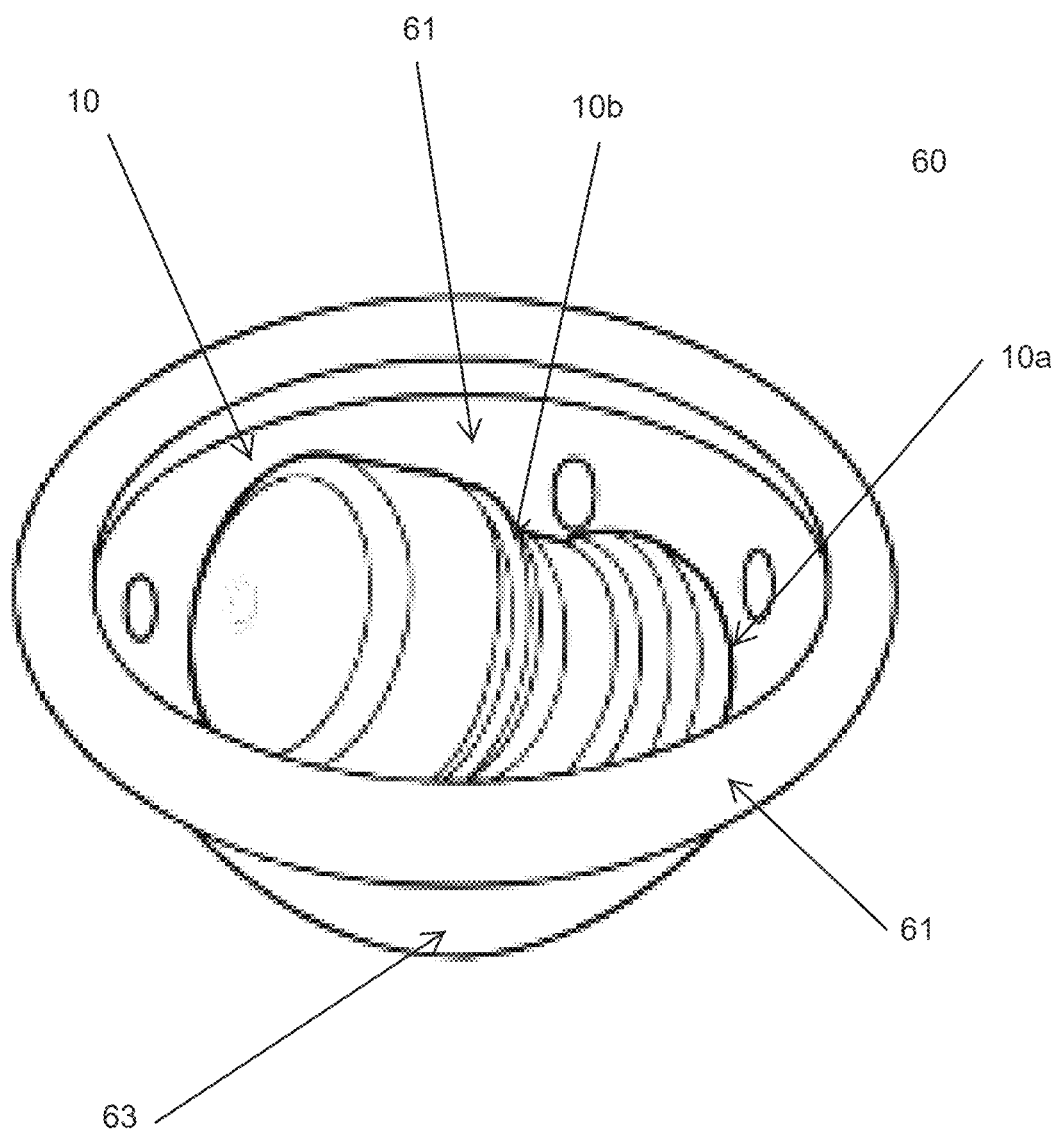
FIG. 7 shows a cylindrical shaped cup retention device for accommodating the container assembly in the vaginal cavity.

This assembly, however, is especially designed for use in intravaginal incubation. To this end, it will be preferably enveloped in a container sleeve or carrier for facilitating intravaginal residence in the posterior fornix. The container sleeve is made of a soft smooth elastic biocompatible material such as a silicone. In the illustrated embodiment (FIG. 7), the sleeve is of one-piece construction cylindrical shaped cup 60 with an aperture inner sidewall 61 extending between opposed rounded ends 62 suitable for cooperation with the vaginal vault. The opposed rounded ends 62 facilitate the removal of the entire container assembly 10 by means of forceps or manual removal. The inner bottom end 63 of the cylindrical shaped cup 60 cradles the bottom end 10a and outer sidewall 10b of the container assembly 10.

After the container assembly 10 is closed and placed in the cylindrical shaped cup 60, it may be introduced into the vaginal vault and positioned in the posterior fornix for 120 hours (5-days) according to current procedure prior to introduction into the vaginal vault, the container assembly 10 may undergo pre-incubating at 37° C. with or without the sleeve for less than two hours, safely in a conventional incubator without a CO2 enriched environment and for the whole incubation period in a CO2 enriched environment.

After intravaginal residence, the improved IVC container is removed from the vaginal cavity and the container inner vessel 20 is then taken out of the container outer rigid shell 11. The contents of the inner vessel 20 where the embryo(s) may then be inspected through one of the opposed sidewalls 23 of the vessel in a recumbent or upright position or transferred to culture dish for evaluation.

Once the desired embryo(s) have been selected, an implantation catheter such as Frydman or Wallace catheter is introduced after opening the closure device 30 by turning the cap 31. The desired embryo(s) may then be aspirated into the catheter and inspected as they are drawn upwardly. The inner vessel 20 may be used for viewing the one or more embryo(s) in the catheter during or after the retrieval from the inner vessel 20.

The embryo(s) may then be implanted in accordance with current practice.

In another embodiment, the upper or outer inverted dome-shaped cap 31 terminates in the peripheral flange 24 of the vessel which comprises opposed pairs of radial projections alternating with and separated by concave zones. The radial projections alternating and separated by and/or the concave zones facilitate the grasping of the inverted dome-shaped cap 31 for facilitating turning between open and closed positions of the valve.

Instead of a single position of the vessel relative to the outer rigid shell 11 disclosed in the first embodiment, the vessel and the outer rigid shell 11 have two stable positions, namely an open position or condition for use when the container assembly 10 is placed in a CO2 enriched environment for incubating the contents and a closed position or condition for sealing the buffer chamber 50 and preventing the escape of the CO2 enriched and O2 depleted contents or the entry of ambient air from the surroundings after the container assembly 10 has been removed from the incubating environment.

In the lower position, a closure seal is defined by the annular notch at the upper end of the inner vessel 20 which works together with a peripheral portion of the undersurface of the peripheral flange 24 of the vessel and the free edge of the peripheral flange 24 of the vessel and possibly the free edge of the peripheral flange 41 of the cap. The closure seal is essentially defined by the contact between the notch and the portions of the peripheral flange 24 of the vessel.

The operation of the improved IVC container will now be described. First, the container is assembled and the inverted dome-shaped cap member 31 is opened. At this point, the inner vessel 20 is rinsed with 1.4 ml culture media. The inner vessel 20 is filled with 0.9 ml of pre-equilibrated culture media. Completely fill the inner vessel 20 with pre-equilibrated (warmed) culture oil to which eggs with attached or injected sperm are to be added after a 5-minute co-incubation. The frustoconical internal sleeve will cooperate with the tapered wall of the pipette so that in the fully inserted position, the outlet orifice of the pipette is well into the main chamber 22. The main chamber 22 will be filled to the level of the frustoconical section, and in practice just below the rearmost part thereof.

At each stage of the filling procedure, the inverted dome-shaped cap member 31 can be closed, which displaces air bubbles that can occur during filling. The inverted dome-shaped cap member 31 reduces the time necessary to fill and will ensure minimal contact between the surrounding air and the chambers of the container.

Prior to intravaginal incubation, the closed IVC container is preferably heated for about one hour in an incubator operating at 37° C.

In order to prevent contamination of the contents of the container during intravaginal residence and to avoid any injury in the course of introducing, removing and residence of the container, it is enveloped after preliminary heating in the incubator in a cylindrical shaped cup 60 of soft smooth biocompatible retention accessory made of medical grade silicone.

The IVC container assembly 10 may be disposed in the posterior fornix cradled in a cylindrical shaped cup 60 medical grade silicone retention accessory.

The preferred period of vaginal incubation of the improved IVC assembly is 5-days incubation. The assembly may be removed by the user or the physician from the posterior fornix by tugging on the cylindrical shaped cup 60 retention accessory and then removing the assembly from the vagina. Thereafter, the cylindrical shaped cup 60 retention accessory and the outer rigid shell 11 are discarded.

The contents of the inner vessel 20 where the embryo(s) may then be inspected through one of the opposed sidewalls of the vessel in a recumbent or upright position or transferred to culture dish for evaluation. The outer rigid shell 11 has corresponding aligned parallel surfaces of optical quality aligned with the opposed sidewalls, in order not to interfere with the inspection of the embryo(s) which will normally be carried out with a laboratory microscope.

Accordingly, at no time, from the moment gametes are introduced into the culture medium in the inner vessel 20 until the moment embryos are retrieved for transfer to the uterus are the gametes or embryos directly in contact with aid and the surroundings. Thanks to the disclosed invention, it will be possible to inspect embryos microscopically without removing them from the IVC container avoiding contact with the surroundings. It will also be appreciated that throughout the entire fertilization and culture procedure, the contents of the IVC container will be protected from contamination by resealable closure means defined by the inverted dome-shaped cap member.

Another level of protection is defined by the cylindrical shaped cup 60 itself which entirely envelopes the closed and sealed container and defines an aseptic barrier to prevent tunneling of bacteria and viruses present at the vaginal cavity and thereby reduce the risk of contamination of embryos when opening and removing the same for transfer.

Alternatively, the cap member and cavity in the plug may be of ovoid shape (not illustrated), with the major axis orthogonal to the container axis. For either of these embodiments, the cooperable stop means (not shown) on the container rear end section and the resealable rigid cap member will define the range of angular displacement of the cap member, limited to approximately 90 degrees.

It would be appreciated that these and other modifications and variants of the container and the IVC container assembly 10 may be adopted without departing from the spirit and scope of the invention.

The invention claimed is:

1. An intravaginal culture (IVC) container comprising:
   a container body sized and configured for intravaginal accommodation, having a smooth outer surface, and made of a $CO_2$ permeable material;
   a tubular cylindrical shaped cup for enveloping the container body intravaginally;
   an inner vessel within the container body, the inner vessel comprising a main chamber, the internal volume of the main chamber being 1.4 ml; and
   an inverted domed cap that displaces a volume of a biological medium in the inner vessel to remove air bubbles during cap closure;
   wherein the main chamber does not include a microchamber.

2. The IVC container of claim 1 wherein the displaced volume is 0.043 ml.

3. The IVC container of claim 1 wherein an upper part of the inner vessel tapers and flows seamlessly down to a bottom part.

4. The IVC container of claim 1 wherein an inner wall surface of the main chamber of the inner vessel tapers gradually and flows towards the bottom of the inner vessel.

5. The (IVC) container of claim 1 comprising 0.9 mL of the biological medium.

6. The IVC container of claim 1 wherein the inner vessel has an orifice and resealable closure means for selectively opening and closing the orifice, and wherein the cylindrical shaped cup has a smooth and continuous outer surface and an internal configuration generally complementary to an external configuration of the container.

7. The IVC container of claim 1 comprising an orifice with resealable closure means comprising a cap member having a throttle passage and means for compressing the inverted dome-shaped cap member to collapse and seal the throttle passage, thereby closing off the IVC container chamber.

8. The IVC container of claim 1 wherein the inner vessel comprises a resealable closure means having a passageway defined by an interior sleeve opening on to one end of the container.

9. An intravaginal culture (IVC) container comprising:
   a container body sized and configured for intravaginal accommodation, having a smooth outer surface, and made of a $CO_2$ permeable material;
   a tubular cylindrical shaped cup for enveloping the container body intravaginally;
   an inner vessel within the container body, the inner vessel comprising a main chamber, the internal volume of the main chamber being 1.4 ml,
     wherein an inner wall surface of the main chamber of the inner vessel tapers gradually and flows towards the bottom of the inner vessel with no separate microchamber,
     wherein an upper part of the inner vessel tapers and flows seamlessly down to a bottom part, and there is no separate microchamber;
   an inverted domed cap that displaces a volume of biological medium in the inner vessel to remove air bubbles during cap closure;
   wherein the inner vessel comprises
     an orifice with a resealable closure means for selectively opening and closing the orifice, the resealable closure means comprising an interior sleeve opening on to one end of the container and a cap member having a throttle passage and a means for compressing the inverted dome-shaped cap member to collapse and seal the throttle passage, thereby closing off the IVC container chamber.

* * * * *